No. 688,382. Patented Dec. 10, 1901.
O. BÖHM.
MECHANISM FOR TRANSMITTING POWER TO DYNAMO MACHINES.
(Application filed Aug. 22, 1901.)
(No Model.) 7 Sheets—Sheet 1.

Fig. 1.

WITNESSES
John Lotka
R. Aberli

INVENTOR
Otto Böhm
by Briesen & Knauth
ATTORNEYS.

No. 688,382. Patented Dec. 10, 1901.
O. BÖHM.
MECHANISM FOR TRANSMITTING POWER TO DYNAMO MACHINES.
(Application filed Aug. 22, 1901.)
(No Model.) 7 Sheets—Sheet 5.

No. 688,382. Patented Dec. 10, 1901.
O. BÖHM.
MECHANISM FOR TRANSMITTING POWER TO DYNAMO MACHINES.
(Application filed Aug. 22, 1901.)
(No Model.) 7 Sheets—Sheet 7.

WITNESSES
John Lotka
R. Aberli

INVENTOR
Otto Böhm
by Briesen & [illegible]
ATTORNEYS

UNITED STATES PATENT OFFICE.

OTTO BÖHM, OF OBERSCHÖNWEIDE, NEAR BERLIN, GERMANY.

MECHANISM FOR TRANSMITTING POWER TO DYNAMO-MACHINES.

SPECIFICATION forming part of Letters Patent No. 688,382, dated December 10, 1901.

Application filed August 22, 1901. Serial No. 72,878. (No model.)

*To all whom it may concern:*

Be it known that I, OTTO BÖHM, engineer, a subject of the German Emperor, and a resident of Wilhelminenhofstrasse 68, Oberschönweide, near Berlin, Germany, have invented certain new and useful Improved Mechanism for Transmitting Power to Dynamo-Machines; and I do hereby declare the following to be a full, clear, and exact description of the invention, such as will enable others skilled in the art to which it appertains to make and use the same.

The present invention refers to mechanisms for transmitting the rotation of a driving-shaft to dynamo-machines, and has for its object automatically to regulate the speed of the dynamo independently of the speed of the driving-pulley in such a way that the pressure or the current or the product of both generated at the terminals is kept at a constant predetermined figure.

The invention consists in interposing frictional transmitting devices between the driving and driven parts, supplying constant means, such as the force of gravity or a spring, to produce a certain amount of frictional pressure, and providing an electromagnet to counteract the said frictional pressure, the excitation of which is controlled by the terminal pressure of the driven machine itself. The action produced by this combination is this, that as soon as the speed of the driven part rises above the predetermined rate the terminal pressure will also exceed the predetermined figure, and the force of the electromagnet will consequently surpass the force producing the frictional pressure, thus reducing or altogether suspending the latter, and thereby also suspending temporarily the driving force. As soon as the speed of the dynamo relaxes the terminal pressure is again reduced and the frictional pressure again increases. If the winding of the dynamo is dimensioned in such a way that the speed which would result if it were constantly driven by the driving-pulley considerably exceeds the speed at which it produces the desired terminal pressure, the action can be compared to a series of short tangential pushes or strokes given to the armature, the time elapsing between every two subsequent pushes varying directly with the speed of the driving-pulley.

The practical application of this device which I preferably have in view is the problem of coupling a dynamo adapted to feed a lighting system to the wheel of a railway-car. Since the speed of the car-wheel is subject to incessant variations, and, on the other hand, also the speed of the dynamo must vary according to the load in order to keep the electrical pressure on the mains constant, it will be readily seen that the practical solution of the proposed problem involves that the transmission should take place under constantly-varying conditions, and I have found that the arrangement outlined above is specially well adapted to fulfil this object. It will be also seen that it will be necessary to provide for the necessity of changing the rotation of the driving-shaft, because in actual practice it will often be necessary—for instance, in shunting a train through a terminus station—to reverse the direction in which it travels. Therefore my present invention also includes a device for reversing the current coming from the armature when the rotation of the driving-shaft is reversed.

The invention also includes an arrangement for uncoupling the dynamo by hand, thus enabling the operator to arrest its motion, though the driving-pulley continues to run.

In the accompanying drawings, Figs. 5 to 7 are different views, partly in section, of a modification of the mechanism forming the subject of the present invention. Fig. 8 is a detail section of the electromagnet belonging thereto.

The same letters of reference are employed to designate corresponding parts in all the figures.

A is the driving-shaft—for instance, the axle of a railway-car. The frame of a dynamo-electric machine C is supported by means of a bearing T on this axle at one side and by a rod G, passing through a projection G' on said frame, at the other side. Two springs $G^2$ and $G^3$, interposed between this projection $G'$ and a shoulder on said rod on the one side and an adjustable stop on the other, form an elastic support for the machine. A pulley $A'$ is keyed to shaft $A$, and another pulley $B'$ is keyed to the shaft $B$, which forms the armature-shaft of the dynamo. Between the driving-pulley $A'$ and the driven pulley $B'$ two friction-wheels D D are interposed, which transmit the motion from one to the other when they are pressed with a sufficient force against the circumference of both. These two wheels D D run in bearings at the ends of a pair of levers E E, themselves pivoted at the ends of a cross-piece F. The cross-piece F is pivoted at its center on the free end of a third lever $F'$, itself pivoted on a fixed journal $F^2$ on the frame of the dynamo. It will be seen that by rocking this lever $F'$ away from the driving-shaft A the friction-wheels D D will be withdrawn from the circumference of the driving-pulley $A'$, and the driving action of the latter will thereby be suspended, and vice versa. In order to provide the necessary frictional pressure between these transmitting-pulleys D and the driving and driven pulleys $A'$ and $B'$, a pair of wire ropes or chains or it might be also rigid rods H H are fastened to the free ends of the levers E E, carrying the pulleys D D. At the point $h$, where the two ropes or rods H H meet, a third rope $H'$ is attached and connects this point with a cross-piece $H^2$. In the preferred construction (shown in Figs. 1 to 4) this whole mechanism is really double, being repeated on the right and left sides of the dynamo-machine.

Figures 2, 4:
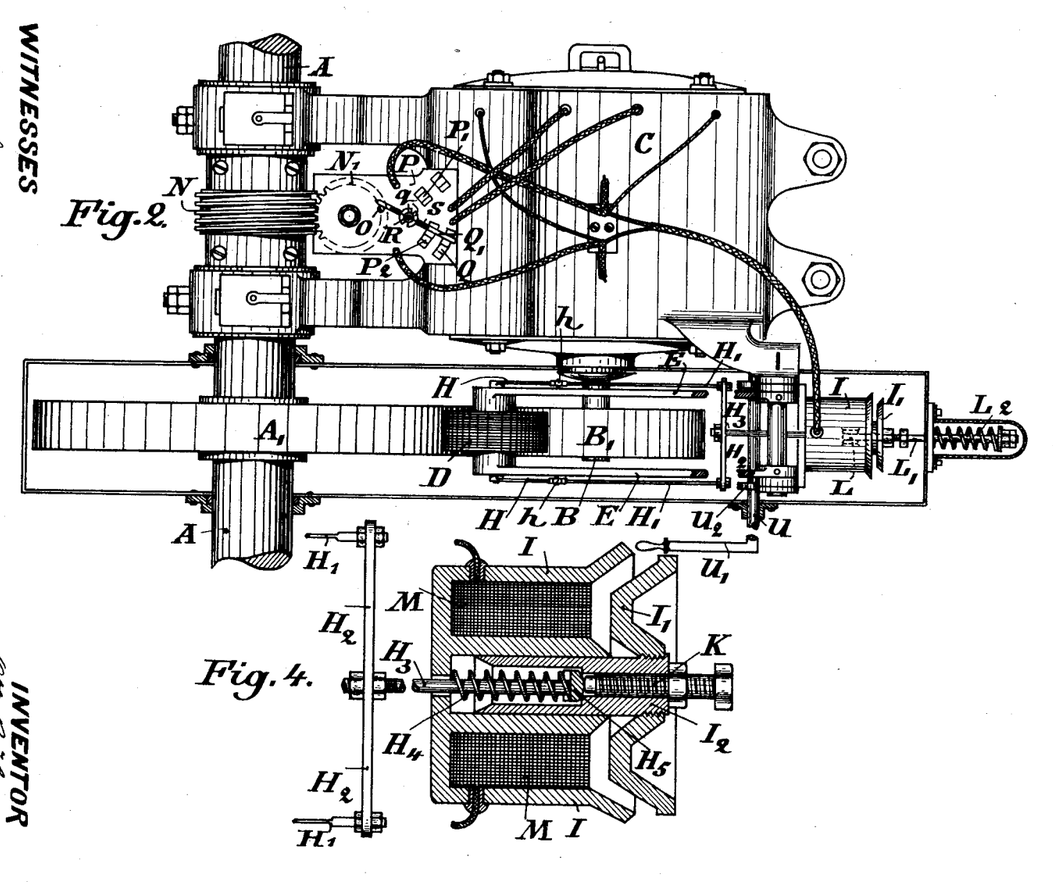
Fig. 4 is a detail section, on an enlarged scale, of the electromagnet.
Figure 3:
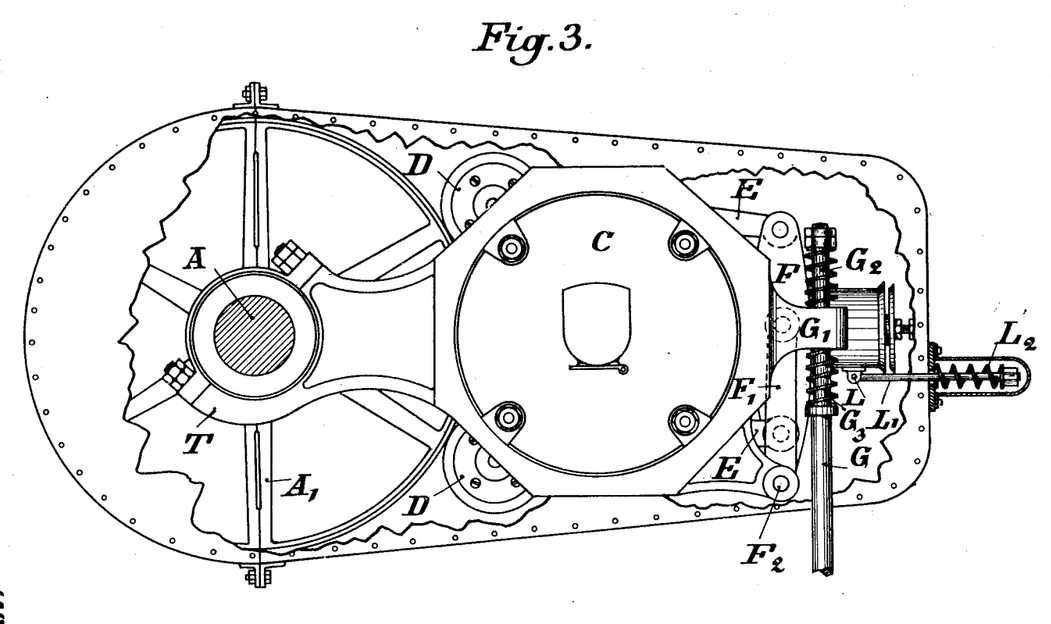
Figure 5:
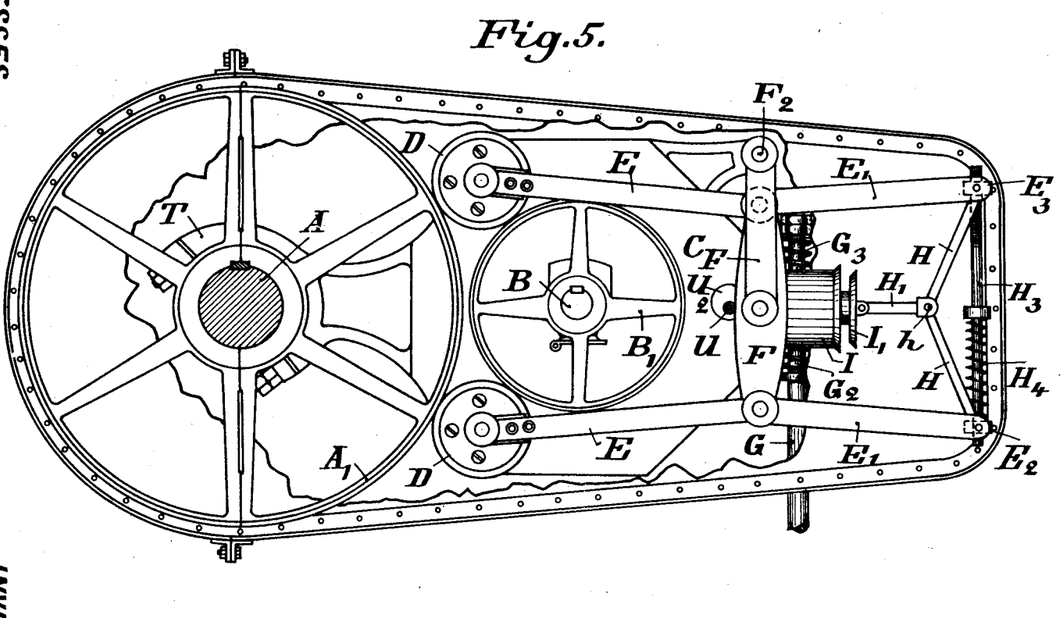

I is the iron core of an electromagnet, which is firmly attached to the cross-piece F and moves with it. The interior arrangement of the electromagnet I is shown in Fig. 4. As will be seen, the inner portion of its core is made in the shape of a tube, and through it passes a rod $H^3$, attached to the center of the cross-piece $H^2$. At the end of this rod a head $H^5$ is formed, and between this head and the bottom of the electromagnet-core I a spring $H^4$ is interposed, which constantly tends to draw the cross-piece $H^2$ toward the electromagnet I. It will be seen that this arrangement tends to diminish the distance between the two transmitting-pulleys D D, and thereby the spring $H^4$ produces a constant frictional pressure between the circumferences of these pulleys and the driving and driven pulleys $A'$ and $B'$. So far the whole arrangement forms a simple power transmission, and its action would be to impart to the armature of the dynamo a rotation directly proportional to the rotation of the driving-shaft.

Referring now once more to Fig. 4, it will be seen that the hollow portion of the core I also contains a sleeve $I^2$, preferably made of unmagnetic material and fitted so as to move to and fro easily in the core I. The exterior end of this sleeve $I^2$ carries the armature $I'$ of the electromagnet out of its position. Finally, an adjusting-screw K permits the regulation of the normal or initial position of the parts. On the outside of the electromagnet I an eye L is attached, and a rod $L'$ is hinged to it, which passes through a fixed portion of the frame and is constantly drawn outward by means of a spring $L^2$. (See Figs. 1 and 3.) The winding M of the electromagnet I is supposed to be inserted between the terminals of the dynamo-machine. The action of the whole arrangement is as follows: In the normal or initial state, the dynamo not as yet generating any current, the electromagnet is not excited, and therefore the spring $H^4$ is free to retract the cross-piece $H^2$, and thereby to press the two transmitting-pulleys D D against the circumferences of the driving and driven pulleys $A'$ and $B'$. The dynamo will therefore follow the motion of the pulley $A'$ and will likewise gradually acquire speed. In the measure, however, in which its speed increases the electromotive force will increase, and consequently the excitation of the electromagnet, the attraction of which upon its armature will gradually begin to counteract the pull of the spring $H^4$ until the normal terminal pressure is exceeded. As soon as this takes place, the adjustments of all parts being properly chosen, the force of the spring $H^4$ is overcome, the wire ropes $H'$ and H H are slackened, and the pulleys D D are free to be removed from the circumference of the driving-pulley. This function is performed by the spring $L^2$, which is now free to retract the electromagnet I and the cross-piece F, to which it is attached. The dynamo will now continue to run merely from its own inertia and as soon as this is used up will slow down, at the same time furnishing less and less exciting-current to the electromagnet, until the force of spring $H^4$ again overcomes the magnetic attraction and forces the transmitting-pulleys D D back against the pulley A, whereupon the same play is repeated.

In actual practice the speed of the pulley $A'$ should considerably exceed the normal speed of the dynamo, allowing for the difference of the diameters of the driving and driven pulleys. The result is that the pulleys D D perform a constant series of vibrations, being periodically applied and withdrawn.

When the speed of the driving-pulley much exceeds the normal speed of the dynamo, the periods in which the transmitting-pulleys are withdrawn are longer, and as the speed of the driving-pulley decreases they likewise decrease.

In Figs. 5 to 8 a modification of the described arrangement is shown, the action of which, however, is the same as that described with reference to Figs. 1 to 4. In this case the levers E E are prolonged beyond their pivots, forming the rear arms $E'$ $E'$, and the rod $H^2$ extends between a swiveled nut $E^2$, attached to the end of one of the arms $E'$, and a likewise-swiveled block $E^3$, gliding freely through a corresponding aperture in the latter. The spring H⁴ is interposed between this block E³ and a shoulder on the rod H², thus tending to increase the distance between the ends of the arms E', and thereby to diminish the distance of the transmitting-pulleys D D. In this case I prefer to construct the system H H H' of rigid rods instead of ropes; but this does not affect the operation as far as the nature of the present invention is concerned. The interior arrangement of the electromagnet I is shown in the enlarged section, Fig. 8, and will be readily understood without further explanation.

The two modifications hitherto described I have found to be best adapted to fulfil the requirements of practical working; but I wish it to be understood that I do not limit myself to these special embodiments of my invention. In order to show, by way of example, that an almost unlimited number of modifications of the same principle are possible, I have added to the drawings a number of diagrammatical representations of such modifications.

Figure 10:
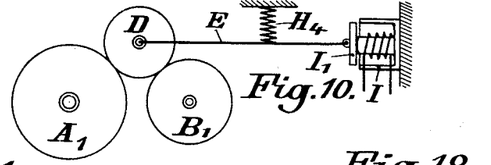
Figs. 10 to 13 are diagrammatical representations of further modifications.

In the modification shown in Fig. 10 the spring H⁴ is interposed directly between a fixed point and the lever E and the electromagnet I is placed in the prolongation of the lever E. The action will be understood without further explanation.

Figure 11:
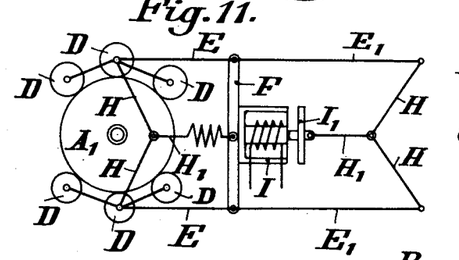
Figure 12:
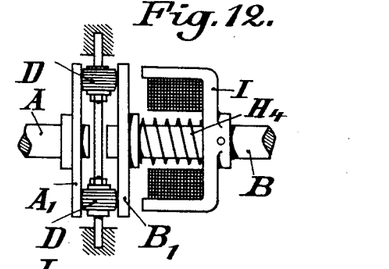
Figure 13:
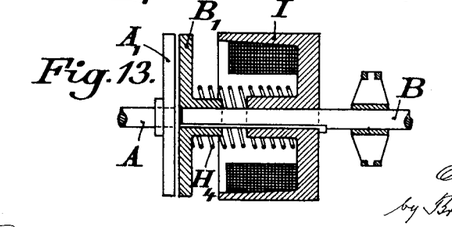

In Fig. 11 it is assumed that both pulleys A' and B' are mounted so as to have a common geometrical axis. In this case the number of the transmitting-pulleys D D can be increased. At the same time, also, the system H H H' is doubled, one system being operated by the spring H⁴ and the other by the electromagnet I. This modification is further followed up in Fig. 12, in which the transmitting-pulleys D D are placed between the driving and driven pulleys A' and B', which in this case take the form of disks. This system involves that instead of moving the transmitting-pulleys the driven disk B' itself is moved by the spring H⁴ and the electromagnet and forms the armature of the latter. In this modification, as is evident, the transmitting-pulleys D D might be altogether omitted, and thus the modification shown in the diagram Fig. 13 would be obtained.

Figures 6, 8:
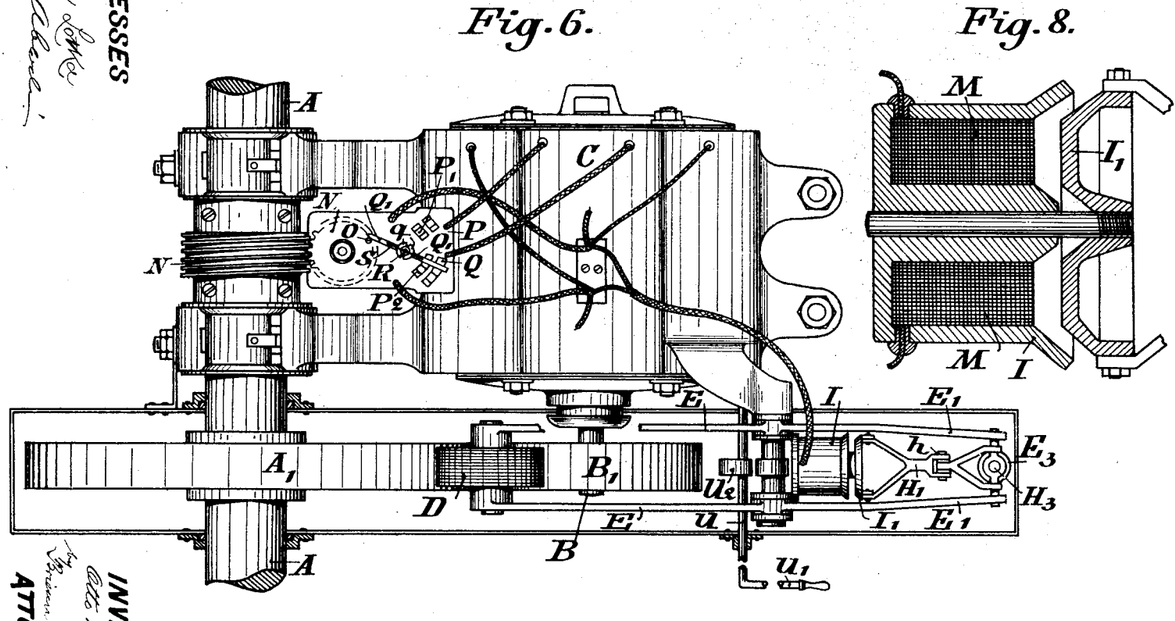
Figure 9:
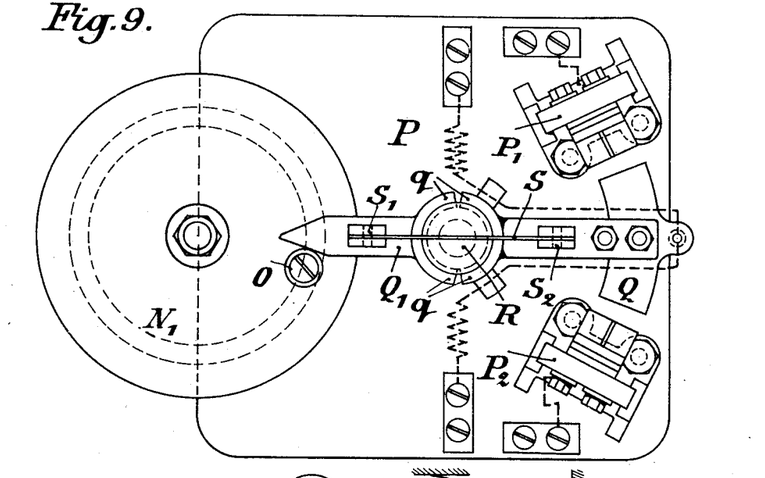
Fig. 9 is a detail view of the reversing-switch on an enlarged scale.

As has been already explained, an arrangement must also be provided for reversing the current when the sense of rotation of the driving-pulley is reversed. The preferred arrangement fulfilling this object is shown in Figs. 2 and 6, and the details of construction are represented on an enlarged scale in Fig. 9. On the driving-shaft A a worm N is provided, which transmits motion to a worm-wheel N', carrying near its circumference a pin O. A switch P of any usual kind, with contact-pieces P' and P² and a contact-arm Q, is arranged and connected in such a way that the current coming from the armature is reversed when Q is switched over from P' to P², and vice versa. The connections are indicated in Figs. 2 and 6, but are not described in detail, because they can be variously arranged by any expert according to known rules. The contact-arm Q is pivoted on a fixed pin R, and the same pin carries a second arm Q', normally forming a rectilinear prolongation of Q. However, both arms are to a certain extent independent of each other and are held in the rectilinear position by a spring S, fixed in blocks S' and S², firmly attached to the arms Q' and Q. Moreover, abutments $q$ $q$ are provided which limit the relative motion of the two arms as soon as a sufficient force is brought into play to overcome the stiffness of the spring S. The arm Q' projects into the path of the pin O and is struck by the same at every revolution of the worm-wheel N'. If the arm Q', and therefore also the arm Q, is in a central position, as shown in Fig. 9, when the operation commences, it will be struck on either side, accordingly as the shaft A commences rotation in one or the other sense. The arm Q will be shifted and will make contact either at P' or at P². As the rotation of A, and consequently also of N', proceeds the arm Q' will be struck by the pin O at every revolution of N'; but since in the oblique position which it has now assumed (see Figs. 2 and 6) it only projects very little into the path of the pin O the joint at R and the spring S will permit it to yield sufficiently to let the pin O pass and no switching will take place until the sense of rotation of A is reversed, when the pin O will strike the arm Q' from the other side and will shift it into the opposite position, thus making contact at P'. The arrangement thus described has been found to act satisfactorily and is therefore preferred; but I desire it to be understood that any other reversing-switch would serve the same purpose without in any way interfering with the nature of my present invention.

Figure 1:
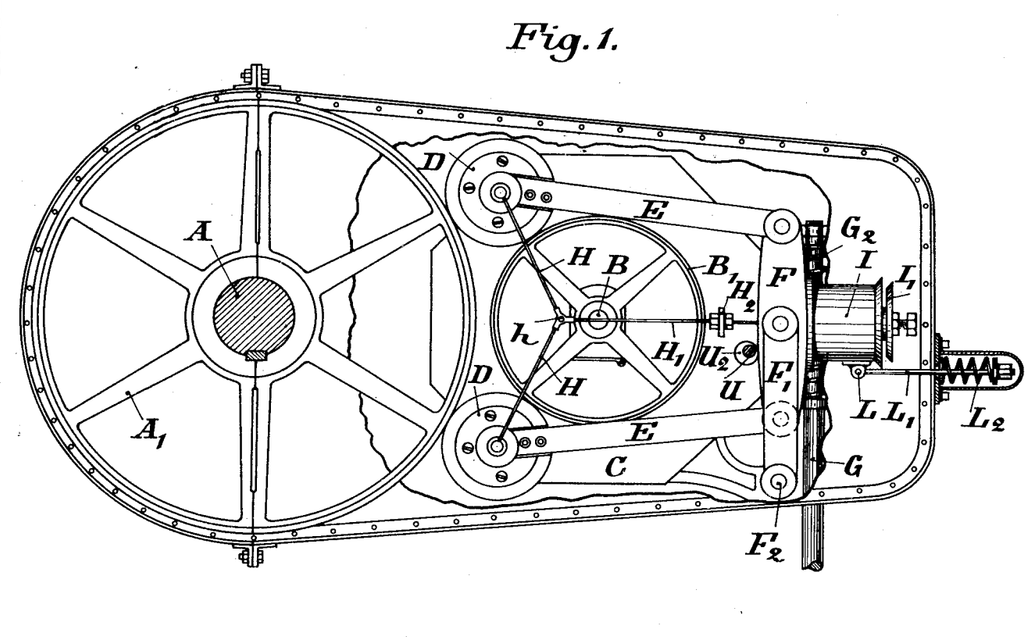
Figures 1 to 3 are different views of the preferred embodiment of my present invention, partly in section.

Referring once more to Figs. 1 and 2, it will be seen that a shaft U, provided with a handle U', is journaled in bearings in a stationary part of the dynamo-casing. This shaft U carries an eccentric cam U², the circumference of which bears against one side of the cross-piece F, as shown in Fig. 1. In the normal position (shown in Fig. 1) this cam U² does not interfere with the operation of the mechanism; but if it is desired to uncouple the dynamo by hand while the rotation of the driving-pulley proceeds it will suffice to turn the handle U', thus retracting, by means of the cam, the cross-piece F, and thereby the transmitting-pulleys D D.

Having now particularly described and ascertained the nature of my said invention and the manner in which the same is to be performed, I declare that what I claim is—

1. In a mechanism for transmitting the rotation of a shaft to a dynamo-electric machine by means of friction the combination with means for producing frictional pressure between the transmitting parts of an electromagnet adapted to counteract said pressure the winding of which is inserted in the circuit of the said dynamo-electric machine, substantially as and for the purpose set forth.

2. In a mechanism for transmitting the rotation of a shaft to a dynamo-electric machine by means of friction the combination with a system of friction-wheels interposed between the driving and the driven parts and means for producing frictional pressure of an electromagnet adapted to counteract said frictional pressure the winding of which is inserted in the circuit of said dynamo-electric machine.

3. In a mechanism for transmitting the rotation of a shaft to a dynamo-electric machine by means of friction the combination with a system of friction-wheels interposed between the driving and driven parts and means for producing frictional pressure between said parts of an electromagnet adapted to counteract said frictional pressure and excited by a winding inserted between the terminals of said dynamo-electric machine.

4. In a mechanism for transmitting the rotation of a shaft to a dynamo-electric machine by means of friction the combination with a system of friction-wheels interposed between the driving and driven parts and means for producing frictional pressure between said wheels and said parts of an electromagnet excited by a winding inserted between the terminal of said dynamo-electric machine and of means for diminishing said frictional pressure such means being adapted to be actuated by the attraction of said electromagnet upon its armature.

5. In a mechanism for transmitting the rotation of a shaft to a dynamo-electric machine by means of friction the combination with a driving-pulley attached to said shaft and a driven pulley attached to the running part of said dynamo of a system of friction-wheels spring-pressed to said pulleys and of an electromagnet excited by a winding inserted between the terminals of said dynamo-electric machine and of means for counteracting the pressure of said spring such means being adapted to be actuated by the attraction of said electromagnet toward its armature.

6. In a mechanism for transmitting the rotation of a shaft upon a dynamo-electric machine by means of friction the combination with a driving-pulley attached to said shaft and a driven pulley attached to the running part of the said dynamo, a system of friction-wheels interposed between said driving and driven pulleys and an electromagnet excited by a winding inserted between the terminals of said dynamo-electric machine of a system of levers carrying said friction-wheels, a spring adapted to operate the said levers in such a way as to increase the pressure of said friction-wheels upon said pulleys and of means for counteracting the force of said spring said means being adapted to be actuated by the attraction of the electromagnet upon its armature.

7. In a mechanism for transmitting the rotation of a driving-pulley upon the pulley of a dynamo-electric machine the combination with a pair of friction-wheels carried by a pair of levers, a spring adapted to constantly approach the operative ends of said levers and thereby to produce frictional pressure of an electromagnet excited by a winding inserted between the terminals of said dynamo-machine and of means for separating the ends of said pair of levers such means being adapted to be actuated by the attraction of said electromagnet upon its armature.

8. In a mechanism for transmitting the rotation of a driving-pulley upon the pulley of a dynamo-electric machine the combination with a pair of friction-wheels interposed between the driving and driven pulleys said wheels being carried by a pair of levers, an electromagnet excited by a winding inserted between the terminals of said dynamo and a system of rods interposed between the operative ends of said levers and the armature of said electromagnet and adapted to release the pressure of said friction-wheels upon said pulleys of a spring counteracting the attraction of said electromagnet upon its armature and of a second spring continually tending to withdraw said friction-wheels out of their operative position.

9. In a mechanism for transmitting the rotation of a driving-pulley upon the pulley of a dynamo-electric machine by means of friction the combination with means for producing frictional pressure between the transmitting parts, an electromagnet the winding of which is inserted between the terminals of said dynamo-electric machine, and means adapted to be actuated by the attraction of said electromagnet upon its armature and to counteract the said frictional pressure of a switch adapted to reverse the current coming from the armature whenever the sense of rotation of the driving-pulley is reversed.

10. In a mechanism for transmitting the rotation of a driving-shaft upon the shaft of a dynamo-electric machine by means of friction the combination with means for producing frictional pressure between the transmitting parts, an electromagnet excited by a winding inserted between the terminals of said dynamo-electric machine, and means for counteracting said frictional pressure said means being adapted to be actuated by the attraction of said electromagnet upon its armature of a pick-up coupled to the driving-pulley and adapted to actuate in either sense according to the sense of rotation of the driving-pulley a lever controlling a switch adapted to reverse the current coming from the armature of the said dynamo substantially as and for the purpose set forth.

11. In a mechanism for transmitting the rotation of a driving-pulley to the pulley of a dynamo the combination with a system of friction-wheels interposed between said driving and driven pulleys, means for producing frictional pressure between said friction-wheels and the driving and driven pulleys an electromagnet excited by a current derived from said dynamo, means for counteracting said frictional pressure said means being adapted to be actuated by the attraction of said electromagnet upon its armature of means for manually withdrawing said friction-wheels from the driving-pulley, substantially as and for the purpose set forth.

12. In an armature speed-regulator, the combination of an electromagnet, a frictional part rotating with the armature, a driving-wheel, a transmitting-wheel arranged to engage the frictional part of the armature and the driving-wheel, a spring-pressed carrier for said transmitting-wheel, and a connection extending from said carrier to the electromagnet so arranged that the attraction of the said electromagnet will tend to withdraw the transmitting-wheel from its active position.

13. In an armature speed-regulator, the combination of an electromagnet, a driven part on the armature, a suitable driving-wheel, a transmitting-wheel arranged to engage both the driving part and the driving-wheel, a spring for normally keeping the said parts in driving engagement, and a connection whereby the electromagnet will act to throw the said parts out of driving action.

14. In an armature speed-regulator, the combination with the coils of a dynamo-electric machine, and an electromagnet the coils of which are connected with the said dynamo-coils, of frictional driving mechanism for the armature-shaft, and a movable core under the influence of said electromagnet and adapted to throw the frictional driving means out of action upon a predetermined increase of speed.

15. In an armature speed-regulator, the combination with an electromagnet, of a frictional driving mechanism for the armature, said mechanism comprising a movable part so that the said mechanism can be thrown into and out of action, a connection whereby the electromagnet will tend to throw said movable part out of action, and means under the control of the operator for throwing the driving mechanism out of action irrespective of the action of said electromagnet.

16. In an armature speed-regulator, the combination of an electromagnet, a driving-shaft, frictional driving mechanism connecting said shaft with the armature-shaft, said driving mechanism comprising a movable part, a connection whereby the electromagnet tends to throw said movable part out of action, connections from the electromagnet-coils to the coils of the dynamo-electrical machine, a reversing-switch connected with the terminals of the dynamo and of the said electromagnet, and reversing mechanism located upon the driving-shaft and constructed to change the position of said switch according to the direction in which the driving-shaft rotates.

In witness whereof I have hereunto set my hand in presence of two witnesses.

OTTO BÖHM.

Witnesses:
 WOLDEMAR HAUPT,
 HENRY HASPER.